United States Patent
Okada et al.

(10) Patent No.: US 9,780,369 B2
(45) Date of Patent: Oct. 3, 2017

(54) CATHODE ACTIVE MATERIAL FOR LITHIUM BATTERIES, AND LITHIUM BATTERY COMPRISING THE CATHODE ACTIVE MATERIAL FOR LITHIUM BATTERIES

(71) Applicants: Shigeto Okada, Fukuoka (JP); Ayuko Kitajou, Kasuga (JP); Ryuichi Tsuji, Toyota (JP); Jun Yoshida, Suntou-gun (JP); Shinji Nakanishi, Mishima (JP)

(72) Inventors: Shigeto Okada, Fukuoka (JP); Ayuko Kitajou, Kasuga (JP); Ryuichi Tsuji, Toyota (JP); Jun Yoshida, Suntou-gun (JP); Shinji Nakanishi, Mishima (JP)

(73) Assignees: KYUSHU UNIVERSITY, NATIONAL UNIVERSITY CORPORATION, Fukuoka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 14/441,991

(22) PCT Filed: Nov. 12, 2013

(86) PCT No.: PCT/JP2013/080561
§ 371 (c)(1),
(2) Date: May 11, 2015

(87) PCT Pub. No.: WO2014/073700
PCT Pub. Date: May 15, 2014

(65) Prior Publication Data
US 2015/0295237 A1    Oct. 15, 2015

(30) Foreign Application Priority Data
Nov. 12, 2012 (JP) .................. 2012-248749

(51) Int. Cl.
H01M 4/505 (2010.01)
H01M 4/525 (2010.01)
(Continued)

(52) U.S. Cl.
CPC ............ *H01M 4/505* (2013.01); *C01G 53/54* (2013.01); *H01M 4/525* (2013.01);
(Continued)

(58) Field of Classification Search
CPC ...... H01M 4/505; H01M 4/525; H01M 4/366; H01M 4/5825; H01M 4/625;
(Continued)

(56) References Cited

U.S. PATENT DOCUMENTS

| | | | |
|---|---|---|---|
| 2010/0078591 A1 | 4/2010 | Sano et al. | |
| 2013/0017449 A1 | 1/2013 | Yasuda et al. | |
| 2013/0236787 A1 | 9/2013 | Sato | |

FOREIGN PATENT DOCUMENTS

| | | | |
|---|---|---|---|
| JP | 2010-086772 A | 4/2010 | |
| JP | 2010-086777 A | 4/2010 | |

(Continued)

OTHER PUBLICATIONS

Sebastian et al.; "Li2MTiO4 (M=Mn, Fe, Co, Ni): New cation-disordered rocksalt oxides exhibiting oxidative deintercalation of lithium. Synthesis of an ordered Li2NiTiO4;" Journal of Solid State Chemistry; vol. 172; pp. 171-177; 2003.

(Continued)

*Primary Examiner* — Milton I Cano
*Assistant Examiner* — Philip A Stuckey
(74) *Attorney, Agent, or Firm* — Oliff PLC

(57) ABSTRACT

The present invention is to provide a cathode active material configured to increase, when used in a lithium battery, the discharge capacity of the lithium battery higher than conventional lithium batteries, and a lithium battery including (Continued)

the cathode active material. Presented is a cathode active material for lithium batteries, wherein the cathode active material is represented by the following composition formula (1) and has a rock salt type crystal structure including formula (1): $Li_2Ni_{1-x-y}Co_xMn_yTiO_4$ wherein x and y are real numbers that satisfy $x>0$, $y>0$ and $x+y<1$.

3 Claims, 2 Drawing Sheets

(51) Int. Cl.
*H01M 10/052* (2010.01)
*C01G 53/00* (2006.01)

(52) U.S. Cl.
CPC ....... *H01M 10/052* (2013.01); *C01P 2002/72* (2013.01); *C01P 2002/76* (2013.01); *C01P 2004/61* (2013.01); *C01P 2006/40* (2013.01); *H01M 2220/30* (2013.01)

(58) Field of Classification Search
CPC .... H01M 4/0525; H01M 4/36; H01M 10/052; H01M 2220/30; H01M 4/52; C01G 53/54; C01P 2006/40; C01P 2002/72; C01P 2002/76; C01P 2004/61
USPC .......................................... 429/223; 252/182
See application file for complete search history.

(56) References Cited

FOREIGN PATENT DOCUMENTS

| JP | 2011-233234 A | 11/2011 | |
|---|---|---|---|
| SI | WO 2009120156 A2 * | 10/2009 | ............ C01D 15/02 |
| WO | 2012/066638 A1 | 5/2012 | |

OTHER PUBLICATIONS

Yang et al.; "Cation disordered rock salt phase Li2CoTiO4 as a potential cathode material for Li-ion batteries;" Journal of Materials Chemistry; vol. 22; pp. 6200-6205; 2012.

* cited by examiner

CATHODE ACTIVE MATERIAL FOR LITHIUM BATTERIES, AND LITHIUM BATTERY COMPRISING THE CATHODE ACTIVE MATERIAL FOR LITHIUM BATTERIES

TECHNICAL FIELD

The present invention relates to a cathode active material configured to increase, when used in a lithium battery, the discharge capacity of the lithium battery higher than conventional lithium batteries, and a lithium battery comprising the cathode active material.

BACKGROUND ART

A secondary battery is a battery that is able to convert chemical energy into electrical energy and discharge the energy. Moreover, it is also a battery that is able to convert electrical energy into chemical energy and store (charge) the chemical energy, by passing electrical current in a direction that is opposite to the direction of current at the time of discharge. Of secondary batteries, secondary batteries as typified by lithium secondary battery have high energy density, so that they are widely used as a power source for portable devices such as laptop personal computer, cellular phone, etc.

In a lithium secondary battery, when graphite (C) is used as an anode active material, a reaction represented by the following formula (I) proceeds at the anode, upon discharge:

$$Li_xC_6 \rightarrow 6C + xLi^+ + xe^- \qquad (I)$$

wherein $0 < x < 1$.

Electrons generated by the reaction of the formula (I) pass through an external circuit, work by an external load, and then reach the cathode. Lithium ions ($Li^+$) generated by the reaction of the formula (I) are transferred by electro-osmosis from the anode side to the cathode side, through an electrolyte sandwiched between the anode and the cathode.

When lithium cobaltate ($Li_{1-x}CoO_2$) is used as a cathode active material, a reaction represented by the following formula (II) proceeds at the cathode, upon discharge:

$$Li_{1-x}CoO_2 + xLi^+ + xe^- \rightarrow LiCoO_2 \qquad (I)$$

wherein $0 < x < 1$.

Upon charging the battery, reactions which are reverse to the reactions represented by the above formulae (I) and (II) proceed at the anode and the cathode. At the anode, graphite in which lithium has been intercalated by graphite intercalation ($Li_xC_6$) becomes reusable, while lithium cobaltate ($Li_{1-x}CoO_2$) is regenerated at the cathode. Because of this, discharge becomes possible again.

Electrode active materials used in lithium batteries are materials that are important for determining the charge-discharge performance of the batteries, and various studies have been conducted. For example, an active material is disclosed in Patent Literature 1, comprising particles which contain a compound having a composition represented by $Li_aMXO_4$, which have a given average primary particle diameter, and which are carried by carbon particles.

CITATION LIST

Patent Literature 1: Japanese Patent Application Laid-Open No. 2010-086772

SUMMARY OF INVENTION

Technical Problem

In Patent Literature 1, it is explained that any one of Fe, Mn, Co, Ni and VO is contained as M of the composition, and Ti or the like is contained as X of the composition (Claim 1 of Patent Literature 1). However, as a result of research, the inventors of the present invention have found that a lithium battery comprising a cathode that contains, as disclosed in Patent Literature 1, only any one kind of metal element such as Mn, may have a low charge-discharge capacity.

The present invention was achieved in light of the above circumstance. An object of the present invention is to provide a cathode active material configured to increase, when used in a lithium battery, the discharge capacity of the lithium battery higher than conventional lithium batteries, and a lithium battery comprising the cathode active material.

Solution to Problem

The cathode active material for lithium batteries according to the present invention is represented by the following composition formula (1) and has a rock salt type crystal structure:

$$Li_2Ni_{1-x-y}Co_xMn_yTiO_4 \qquad \text{Composition formula (1):}$$

wherein x and y are real numbers that satisfy $x > 0$, $y > 0$ and $x + y < 1$.

In the present invention, preferably, x and y in the composition formula (1) are real numbers that satisfy $0.1 < x < 0.8$, $0.1 < y < 0.8$ and $x + y < 1$.

In the present invention, preferably, the rock salt type crystal structure is an irregular rock salt type crystal structure.

The lithium battery of the present invention comprises a cathode, an anode and an electrolyte layer disposed between the cathode and the anode, wherein the cathode comprises at least the above-mentioned cathode active material for lithium batteries.

Advantageous Effects of Invention

According to the present invention, by containing all of nickel, cobalt and manganese, lithium diffusivity can be increased higher than conventional cathode active materials for lithium batteries, in which these metal elements is not contained. Therefore, when used in a lithium battery, the charge-discharge capacity of the lithium battery can be increased higher than conventional lithium batteries.

DESCRIPTION OF EMBODIMENTS

Figure 1:
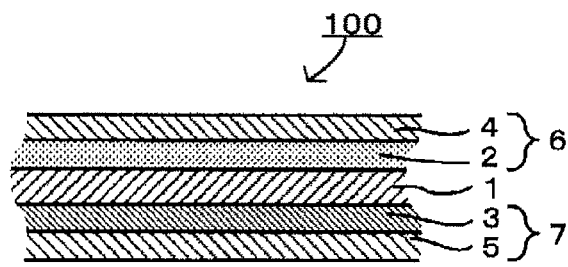
FIG. 1 is a view showing an example of the layer structure of the lithium battery according to the present invention, and it is also a view schematically showing a section of the lithium battery cut along the layer laminating direction.

1. Cathode Active Material for Lithium Batteries

The cathode active material for lithium batteries according to the present invention is represented by the following composition formula (1) and has a rock salt type crystal structure:

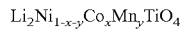

$Li_2Ni_{1-x-y}Co_xMn_yTiO_4$      Composition formula (1):

wherein x and y are real numbers that satisfy x>0, y>0 and x+y<1.

In general, the actual capacities of conventional $Li_2MTiO_4$-based cathode active materials as disclosed in Patent Literature 1, in which only one kind of metal element is contained as M, are only about half the theoretical capacities thereof. Conventional $Li_2MTiO_4$-based cathode active materials have lithium ion diffusion paths in the chemical structures thereof; however, when used in lithium batteries, they have such a problem that a sufficient amount of lithium ions cannot be diffused. This is considered because conventional $Li_2MTiO_4$-based cathode active materials have low lithium ion diffusion coefficients, so that a sufficient amount of lithium ion diffusion paths are not secured.

In theory, 2 mol of lithium ions should diffuse with respect to 1 mol of $Li_2MTiO_4$. However, examples of conventional $Li_2MTiO_4$-based cathode active materials which allow the diffusion of 2 mol of lithium ions, are not known yet. The examples which allow the diffusion of 2 mol of lithium ions mean charge reaction examples in which two electrons are involved, such as a reaction represented by the following formula (III), and discharge reaction examples in which two electrons are involved, such as a reverse reaction to the following formula (III):

$Li_2MTiO_4 \rightarrow MTiO_4 + 2Li^+ + 2e^-$      Formula (III):

The inventors of the present invention considered that in order to achieve the two-electron reaction as represented by the formula (III), it is necessary that a sufficient amount of lithium ion diffusion paths are secured in the chemical structure. As a result of intensive research on the transition metal site M of $Li_2MTiO_4$, the inventors have succeeded in synthesizing a so-called ternary cathode active material in which nickel, cobalt and manganese are all disposed at the transition metal site M. Moreover, they have found that by using the cathode active material in a lithium battery, a higher charge-discharge capacity than conventional lithium batteries can be obtained. Based on the above knowledge, the inventors completed the present invention.

The cathode active material for lithium batteries according to the present invention is represented by the above composition formula (1) and has a rock salt type crystal structure. In the present invention, preferably, the rock salt type crystal structure is an irregular rock salt type crystal structure. In the present invention, the irregular rock salt type crystal structure means a crystal structure which has a peak in space group Fm-3m.

In the composition formula (1), preferably, x and y are real numbers that satisfy 0.1<x<0.8, 0.1<y<0.8 and x+y<1.

When any one of the values of x and y is larger than the upper limit of the preferable range and the other value is smaller than the lower limit of the preferable range, the composition of the resulting cathode active material is not substantially different from the composition of conventional cathode active materials in which only one metal element is contained as the transition metal site M; therefore, a sufficient discharge capacity may not be obtained.

In the composition formula (1), x and y are more preferably real numbers that satisfy 0.15<x<0.7, 0.15<y<0.7 and x+y<1. Also in the composition formula (1), x, y and z still more preferably satisfy x=y=z=⅓.

In the present invention, for example, the average particle diameter of the cathode active material for lithium batteries is preferably in a range of 1 to 50 μm, more preferably in a range of 1 to 20 μm, particularly preferably in a range of 3 to 5 μm. This is because, when the average particle diameter of the cathode active material for lithium batteries is too small, the handling properties of the cathode active material may be deteriorated; moreover, when the average particle diameter of the cathode active material for lithium batteries is too large, it may be difficult to obtain a flat cathode active material layer. In the present invention, the average particle diameter of the cathode active material for lithium batteries can be obtained by observing the cathode active material for lithium batteries with a scanning electron microscope (SEM), measuring the diameters of the particles of the cathode active material for lithium batteries, and then calculating the average of the particle diameters.

The method for producing the cathode active material for lithium batteries according to the present invention, is as follows.

First, as raw materials, a lithium compound, a nickel compound, a cobalt compound, a manganese compound and a titanium compound are prepared. It is not needed to prepare all of the five kinds of compounds. For example, when the lithium compound contains a cobalt element, it is not needed to prepare a cobalt compound.

As the lithium compound, for example, there may be mentioned lithium carbonate ($Li_2CO_3$), lithium acetate ($CH_3CO_2Li$), lithium nitrate ($LiNO_3$) and hydrates thereof.

As the nickel compound, for example, there may be mentioned nickel(II) hydroxide ($Ni(OH)_2$), nickel(II) acetate ($Ni(CH_3CO_2)_2$), nickel(II) nitrate ($Ni(NO_3)_2$), nickel (II) sulfate ($NiSO_4$), nickel(II) oxalate ($NiC_2O_4$), nickel(II) chloride ($NiCl_2$) and hydrates thereof.

As the cobalt compound, for example, there may be mentioned cobalt(II) hydroxide ($Co(OH)_2$), cobalt(II) acetate ($Co(CH_3CO_2)_2$), cobalt(II) nitrate ($Co(NO_3)_2$), cobalt(II) sulfate ($CoSO_4$), cobalt(II) oxalate ($CoC_2O_4$), cobalt(II) chloride ($CoCl_2$) and hydrates thereof.

As the manganese compound, for example, there may be mentioned manganese(II) oxide (MnO), manganese(II) acetate ($Mn(CH_3CO_2)_2$), manganese(II) nitrate ($Mn(NO_3)_2$), manganese(II) sulfate ($MnSO_4$), manganese(II) oxalate ($MnC_2O_4$), manganese(II) chloride ($MnCl_2$) and hydrates thereof.

As the titanium compound, for example, there may be mentioned titanium(II) oxide (TiO), tetraisopropyl orthotitanate ($Ti(OCH(CH_3)_2)_4$), titanium(IV) tetrabutoxide ($Ti(OC_4H_9)_4$), dititanium trioxide ($Ti_2O_3$) and hydrates thereof.

The mixing ratio of the raw materials preferably corresponds to the composition ratio of the elements of the composition formula (1). In particular, from the composition formula (1), the ratio of the metal elements in the cathode active material for lithium batteries is Li:Ni:Co:Mn:Ti=2:(1−x−y):x:y:1. Therefore, the mixing ratio of the raw materials can be adjusted so that the composition obtained after the mixing corresponds to the ratio of the metal elements.

In the production method of the present invention, in order to uniformly mix the raw materials, it is preferable to carry out mechanical milling.

The mechanical milling is not particularly limited, as long as it is a method of mixing the raw materials, with applying mechanical energy to the mixture. For example, there may be mentioned a ball mill, a turbo mill, mechanofusion and a disk mill. Of them, preferred is a ball mill. From the point of view that the cathode active material for lithium batteries which has the desired composition as represented by the composition formula (1) can be obtained, a planetary ball mill is preferred.

The conditions of the ball mill are determined so that the cathode active material for lithium batteries represented by the composition formula (1) can be obtained. For example, in the case of using the planetary ball mill, the mixture of the raw materials and grinding balls are put in a pot and processed at a predetermined rotational frequency and for a predetermined time. As the material of the grinding balls, for example, there may be mentioned zirconia ($ZrO_2$).

In the case of using a planetary ball mill, for example, the rotational frequency is preferably 100 to 300 rpm, more preferably 150 to 250 rpm. The processing time is, for example, preferably in the range of 30 minutes to 24 hours, more preferably in the range of 1 to 5 hours.

Finally, the content of the pot is emptied on a mesh or the like to separate the balls therefrom, thereby obtaining a precursor of the cathode active material for lithium batteries according to the present invention.

In this production method, the desired (target) cathode active material for lithium batteries can be obtained by heating the precursor obtained after the mixing.

The method for heating the precursor is not particularly limited. It is preferable to fire the precursor in an inert gas atmosphere such as argon atmosphere or nitrogen atmosphere. The firing temperature is preferably 500 to 1,100° C., more preferably 700 to 1,000° C. The firing time is preferably 5 to 48 hours, more preferably 10 to 24 hours.

2. Lithium Battery

The lithium battery of the present invention comprises a cathode, an anode and an electrolyte layer disposed between the cathode and the anode, wherein the cathode comprises at least the above-mentioned cathode active material for lithium batteries.

The cathode active material for lithium batteries has a high charge-discharge capacity; therefore, the lithium battery containing the cathode active material for lithium batteries can provide excellent charge-discharge performance.

FIG. 1 is a view showing an example of the layer structure of the lithium battery according to the present invention, and it is also a view schematically showing a section of the lithium battery cut along the layer laminating direction. The lithium battery of the present invention is not limited to this example.

A lithium battery 100 comprises a cathode 6, an anode 7 and an electrolyte layer 1, the cathode 6 comprising a cathode active material layer 2 and a cathode current collector 4, the anode 7 comprising an anode active material layer 3 and an anode current collector 5, and the electrolyte layer 1 being sandwiched between the cathode 6 and the anode 7.

Hereinafter, the cathode, anode and electrolyte layer which are used in the lithium battery of the present invention, and a separator and a battery case, which are suitably used in the lithium battery of the present invention, will be described in detail.

The cathode used in the present invention preferably comprises a cathode active material layer which comprises the above-described cathode active material. In addition, the cathode generally comprises a cathode current collector and a cathode lead that is connected to the cathode current collector.

In the present invention, the above-mentioned cathode active material for lithium batteries according to the present invention is used. In the present invention, the cathode active material for lithium batteries according to the present invention can be used alone or in combination with one or more other kinds of cathode active materials.

Concrete examples of other kinds of cathode active materials include $LiCoO_2$, $LiNi_{1/3}Mn_{1/3}Co_{1/3}O_2$, $LiNiPO_4$, $LiMnPO_4$, $LiNiO_2$, $LiMn_2O_4$, $LiCoMnO_4$, $Li_2NiMn_3O_8$, $Li_3Fe_2(PO_4)_3$ and $Li_3V_2(PO_4)_3$. The surfaces of fine particles comprising the cathode active material can be coated with $LiNbO_3$, etc.

The total content of the cathode active material in the cathode active material layer is generally in a range of 50 to 90% by mass.

The thickness of the cathode active material layer used in the present invention varies depending on the intended use of the lithium battery, etc. However, the thickness is preferably in a range of 10 to 250 μm, more preferably in a range of 20 to 200 μm, particularly preferably in a range of 30 to 150 μm.

As needed, the cathode active material layer can contain an electroconductive material, a binder, etc.

The electroconductive material used in the present invention is not particularly limited, as long as it can increase the electrical conductivity of the cathode active material layer. The examples include carbon blacks such as acetylene black and Ketjen Black. The content of the electroconductive material in the cathode active material layer varies depending on the type of the electroconductive material; however, it is generally in a range of 1 to 30% by mass.

As the binder used in the present invention, for example, there may be mentioned polyvinylidene fluoride (PVdF) and polytetrafluoroethylene (PTFE). The content of the binder in the cathode active material layer is required to be a content which allows the cathode active material and so on to be fixed, and it is preferably as small as possible. The content of the binder is generally in a range of 1 to 10% by mass.

To prepare the cathode active material, a dispersion medium such as N-methyl-2-pyrrolidone or acetone can be used.

The cathode current collector used in the present invention functions to collect current from the cathode active material layer. Examples of materials for the cathode current collector include aluminum, stainless-steel (SUS), nickel, iron and titanium. Of them, preferred are aluminum and stainless-steel (SUS). Examples of the form of the cathode current collector include a foil form, a plate form and a mesh form. Of them, preferred is a foil form.

The method for producing the cathode used in the present invention is not particularly limited, as long as it is a method that can provide the above-described cathode. After forming the cathode active material layer, the cathode active material layer can be pressed to increase the electrode density.

The anode used in the present invention preferably comprises an anode active material layer comprising an anode active material. In general, it further comprises an anode current collector and an anode lead that is connected to the anode current collector.

The anode active material used in the present invention is not particularly limited, as long as it can occlude and/or release lithium ions. For example, there may be mentioned lithium metals, lithium alloys, lithium-containing metal oxides, lithium-containing metal sulfides, lithium-containing metal nitrides and carbonaceous materials such as graphite. The anode active material can be in a powder form or thin film form.

Examples of lithium alloys include lithium-aluminum alloy, lithium-tin alloy, lithium-lead alloy and lithium-silicon alloy. Examples of lithium-containing metal oxides include lithium-titanium oxide. Examples of lithium-containing metal nitrides include lithium-cobalt nitride, lithium-iron nitride and lithium-manganese nitride. Also, solid electrolyte-coated lithium can be used as the anode active material.

The anode active material layer can comprise only the anode active material, or it can comprise at least one of the electroconductive material and the binder, in addition to the anode active material. For example, when the anode active material is in a foil form, the anode active material layer can be an anode active material layer comprising only the anode active material. When the anode active material is in a powder form, the anode active material layer can be an anode active material layer comprising the anode active material and the binder. The electroconductive material and the binder are not described here, since they are the same as those contained in the above-described cathode active material layer.

The thickness of the anode active material layer is not particularly limited. For example, it is preferably in a range of 10 to 100 μm, particularly preferably in a range of 10 to 50 μm.

Such a structure is allowed that the electrode active material layer of at least one of the cathode and the anode contains at least the electrode active material and an electrolyte for electrodes. In this case, as the electrolyte for electrodes, there may be mentioned a solid electrolyte (such as solid oxide electrolyte or solid sulfide electrolyte) or gel electrolyte as mentioned below, for example.

As the material for the anode current collector, there may be used the same materials as the above-mentioned materials for the cathode current collector. As the form of the anode current collector, there may be used the same forms as the above-mentioned forms of the cathode current collector.

The method for producing the anode used in the present invention is not particularly limited, as long as it is a method that can provide the above-described anode. After forming the anode active material layer, the anode active material layer can be pressed to increase the electrode density.

The electrolyte layer used in the present invention is sandwiched between the cathode and the anode and functions to exchange lithium ions therebetween.

As the electrolyte layer, there may be used a liquid electrolyte, a gel electrolyte, a solid electrolyte, etc. They may be used alone or in combination of two or more kinds.

As the liquid electrolyte, there may be used a non-aqueous liquid electrolyte or an aqueous liquid electrolyte.

As the non-aqueous liquid electrolyte, generally, one containing a lithium salt and a non-aqueous solvent is used. As the lithium salt, for example there may be mentioned inorganic lithium salts such as $LiPF_6$, $LiBF_4$, $LiClO_4$ and $LiAsF_6$; and organic lithium salts such as $LiCF_3SO_3$, $LiN(SO_2CF_3)_2$(Li-TFSA), $LiN(SO_2C_2F_5)_2$ and $LiC(SO_2CF_3)_3$. As the non-aqueous solvent, for example, there may be mentioned ethylene carbonate (EC), propylene carbonate (PC), dimethyl carbonate (DMC), diethyl carbonate (DEC), ethyl methyl carbonate (EMC), ethyl carbonate, butylene carbonate, γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and mixtures thereof. The concentration of the lithium salt in the non-aqueous liquid electrolyte is 0.5 to 3 mol/kg, for example.

In the present invention, as the non-aqueous liquid electrolyte or non-aqueous solvent, there may be used an ionic liquid, for example. Examples of the ionic liquid include N-methyl-N-propylpiperidinium bis(trifluoromethanesulfonyl)amide (PP13TFSA), N-methyl-N-propylpyrrolidinium bis(trifluoromethanesulfonyl)amide (P13TFSA), N-butyl-N-methylpyrrolidinium bis(trifluoromethanesulfonyl)amide (P14TFSA), N,N-diethyl-N-methyl-N-(2-methoxyethyl) ammonium bis(trifluoromethanesulfonyl)amide (DEMETFSA) and N,N,N-trimethyl-N-propylammonium bis(trifluoromethanesulfonyl)amide (TMPATFSA).

As the aqueous liquid electrolyte, generally, one containing a lithium salt and water is used. As the lithium salt, for example, there may be mentioned lithium salts such as LiOH, LiCl, $LiNO_3$ and $CH_3CO_2Li$.

The gel electrolyte used in the present invention is generally one gelled by adding a polymer to a non-aqueous liquid electrolyte. For example, a non-aqueous gel electrolyte can be obtained by gelling the above-mentioned non-aqueous liquid electrolyte by adding one or more kinds of polymers, such as polyethylene oxide (PEO), polyacrylonitrile (PAN), polymethyl methacrylate (PMMA), polyurethane, polyacrylate and cellulose, to the non-aqueous liquid electrolyte. In the present invention, $LiTFSA(LiN(CF_3SO_2)_2)$-PEO-based non-aqueous gel electrolyte is preferred.

As the solid electrolyte, there may be used a sulfide-based solid electrolyte, an oxide-based solid electrolyte, a polymer electrolyte, etc.

Concrete examples of the sulfide-based solid electrolyte include $Li_2S$—$P_2S_5$, $Li_2S$—$P_2S_3$, $Li_2S$—$P_2S_3$—$P_2S_5$, $Li_2S$—$SiS_2$, $Li_2S$—$Si_2S$, $Li_2S$—$B_2S_3$, $Li_2S$—$GeS_2$, LiI—$Li_2S$—$P_2S_5$, LiI—$Li_2S$—$SiS_2$—$P_2S_5$, $Li_2S$—$SiS_2$—$Li_4SiO_4$, $Li_2S$—$SiS_2$—$Li_3SiO_4$, $Li_3PS_4$—$Li_4GeS_4$, $Li_{3.4}P_{0.6}Si_{0.4}S_4$, $Li_{3.25}P_{0.25}Ge_{0.76}S_4$, and $Li_{4-x}Ge_{1-x}$—$P_xS_4$.

Concrete examples of the oxide-based solid electrolyte include LiPON (lithium phosphate oxynitride), $Li_{1.3}Al_{0.3}Ti_{0.7}(PO_4)_3$, $La_{0.51}Li_{0.34}TiO_{0.74}$, $Li_3PO_4$, $Li_2SiO_2$ and $Li_2SiO_4$.

In general, the polymer electrolyte contains a lithium salt and a polymer. As the lithium salt, there may be used at least one of the above-mentioned inorganic and organic lithium salts. The polymer is not particularly limited, as long as it can form a complex with a lithium salt. As the polymer, for example, there may be mentioned polyethylene oxide.

In the lithium battery of the present invention, a liquid electrolyte-impregnated separator can be disposed between the cathode and the anode. As the separator, for example, there may be mentioned porous films such as those made of polyethylene and polypropylene, and non-woven fabrics such as resin non-woven fabric and glass fiber non-woven fabric.

The lithium battery of the present invention generally comprises a battery case for housing the cathode, the anode, the electrolyte layer, etc. As the form of the battery case, in particular, there may be mentioned a coin form, a flat plate form, a cylinder form, a laminate form, etc.

EXAMPLES

Hereinafter, the present invention will be described further in detail, by way of examples and comparative examples. However, the present invention is not limited to these examples.

1. Production of Cathode Active Materials for Lithium Batteries

Example 1

Lithium carbonate ($Li_2CO_3$), nickel(II) hydroxide (Ni$(OH)_2$), cobalt(II) hydroxide ($Co(OH)_2$), manganese(II) oxide (MnO) and titanium(II) oxide (TiO) were mixed at the following molar ratio: $Li_2CO_3$:Ni$(OH)_2$:Co$(OH)_2$:MnO:TiO=3:1:1:1:3. The thus-obtained powder was fired in an argon atmosphere at 900° C. for 24 hours, thereby producing the cathode active material for lithium batteries of Example 1 ($Li_2Ni_{1/3}Co_{1/3}Mn_{1/3}TiO_4$).

Comparative Example 1

Lithium carbonate ($Li_2CO_3$), cobalt(II) hydroxide (Co$(OH)_2$) and titanium(II) oxide (TiO) were mixed at the following molar ratio: $Li_2CO_3$:Co$(OH)_2$:TiO=1:1:1. The thus-obtained powder was fired in the same conditions as Example 1, thereby producing the cathode active material for lithium batteries of Comparative Example 1 ($Li_2CoTiO_4$).

2. Crystal Structure Analysis of Cathode Active Materials for Lithium Batteries

X-ray diffraction measurement was carried out on the cathode active materials for lithium batteries of Example 1 and Comparative Example 1.

Detailed measurement conditions are as follows.

X-ray diffraction measurement device: RINT-2500 (manufactured by Rigaku Corporation)

Measurement range: 2θ=10 to 80°

Measurement interval: 0.02°

Scan rate: 2°/min

Measurement voltage: 50 kV

Measurement current: 300 mA

Figure 2:
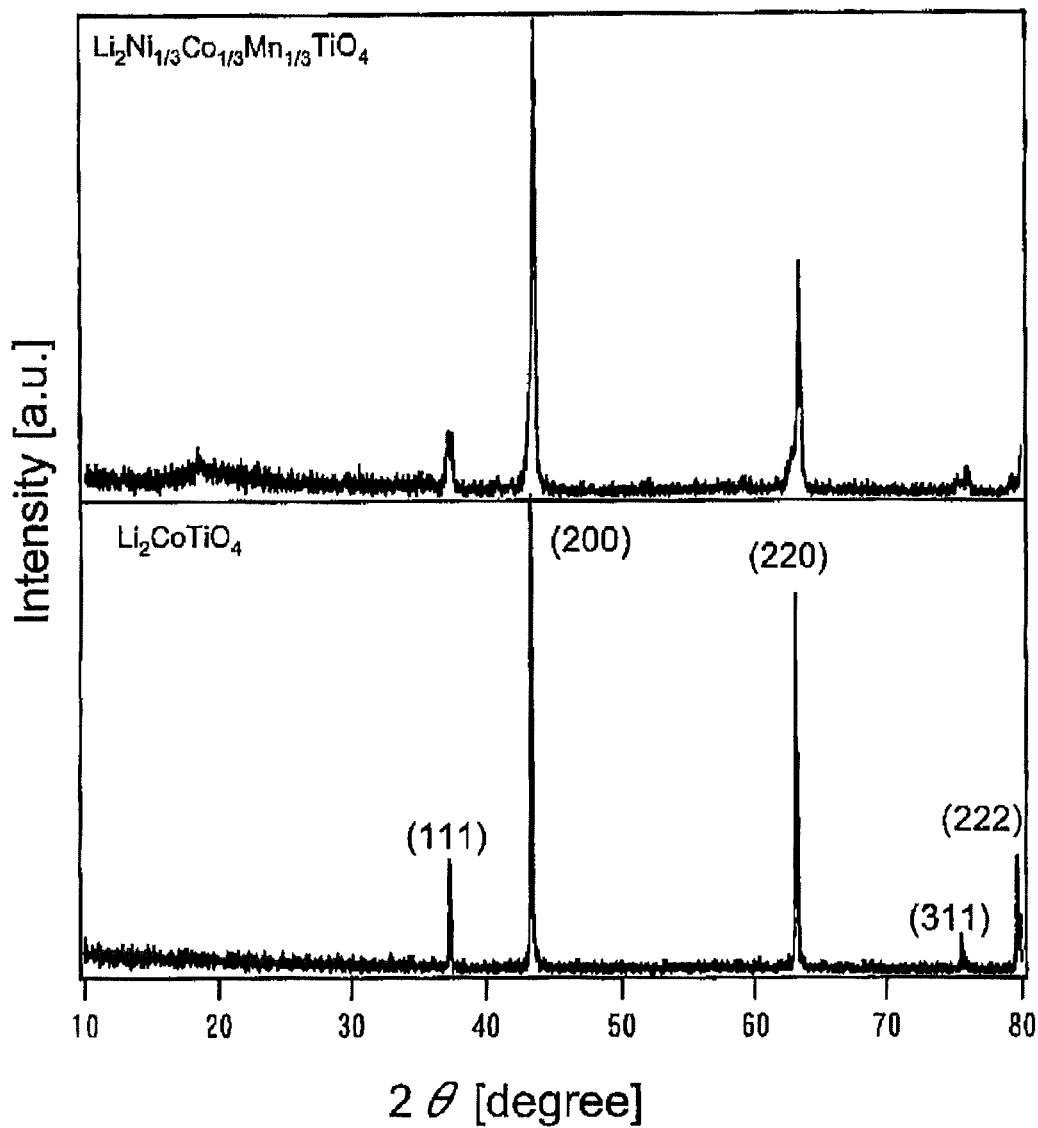
FIG. 2 is a graph showing the XRD patterns of the cathode active materials for lithium batteries of Example 1 and Comparative Example 1, side by side.

FIG. 2 is a graph showing the XRD patterns of the cathode active materials for lithium batteries of Example 1 and Comparative Example 1, side by side.

As is clear from the lower spectrum shown in FIG. 2, in the XRD pattern of Comparative Example 1, sharp peaks are observed at 2θ=38°, 43°, 63°, 76° and 80°. These peaks indicates that the crystal structure of the cathode active material for lithium batteries of Comparative Example 1 is an irregular rock salt type crystal structure. The peak at 2θ=38° is assigned to the diffraction of a (111) plane. The peak at 2θ=43° is assigned to the diffraction of a (200) plane. The peak at 2θ=63° is assigned to the diffraction of a (220) plane. The peak at 2θ=76° is assigned to the diffraction of a (311) plane. The peak at 2θ=80° is assigned to the diffraction of a (222) plane.

On the other hand, as is clear from the upper spectrum shown in FIG. 2, in the XRD pattern of Example 1, sharp peaks also are observed at 2θ=38°, 43°, 63°, 76° and 80°, as with Comparative Example 1. Therefore, it is clear from FIG. 2 that the crystal structure of the cathode active material for lithium batteries of Example 1 is also an irregular rock salt type crystal structure.

From the above, it is confirmed that impurity-free $Li_2Ni_{1/3}Co_{1/3}Mn_{1/3}TiO_4$ could be synthesized in Example 1. It is also confirmed that even when, like Example 1, nickel, cobalt and manganese are added at the same molar ratio, an irregular rock salt type crystal structure similar to that of Comparative Example 1 is obtained.

3. Production of Lithium Batteries

Example 2

First, the cathode active material for lithium batteries of Example 1 was prepared as a cathode active material; acetylene black (product name: HS-100; manufactured by: Denki Kagaku Kogyo Kabushiki Kaisha) was prepared as an electroconductive material; and PVdF (KR Polymer #7305 manufactured by Kureha Corporation) was prepared as a binder. The cathode active material, the electroconductive material and the binder were mixed at the following ratio to produce a cathode mix: cathode active material:electroconductive material:binder=70% by mass:25% by mass:5% by mass. To the cathode mix, an appropriate amount of N-methyl-2-pyrrolidone (manufactured by Nacalai Tesque, Inc.) was added as a dispersion medium.

As a cathode current collector, a nickel mesh was prepared.

As an anode, a lithium metal foil (manufactured by Honjo Metal Co., Ltd.) was prepared.

As a liquid electrolyte, 1 mol/L $LiPF_6$ (solvent EC:DMC=1:1, manufactured by Kishida Chemical Co., Ltd.) was prepared.

As a battery case, a coin cell (model SUS2032) was prepared. The cathode current collector, the cathode mix, the electrolyte layer and the anode were housed in the battery case in the following order: nickel mesh; cathode mix layer; electrolyte layer; and lithium metal foil. Therefore, the lithium battery of Example 2 was produced.

The above processes were all carried out in a glove box under a nitrogen atmosphere.

Comparative Example 2

The lithium battery of Comparative Example 2 was produced in the same manner as Example 2, except that the cathode active material for lithium batteries of Comparative Example 1 was used as the cathode active material, in place of the cathode active material for lithium batteries of Example 1.

4. Charge-Discharge Test of Lithium Batteries

Charge-discharge test was carried out on the lithium batteries of Example 2 and Comparative Example 2. In particular, first, in the following current density condition, the lithium batteries were charged in constant current mode, up to 4.8 V. Next, they were discharged to 2 V, and the thus-obtained capacities were deemed as their discharge capacities. Charge-discharge cycle was run two times on each battery.

Current density of Example 2: 0.011 mA/cm$^2$

Current density of Comparative Example 2: 0.0017 mA/cm$^2$

Figure 3:
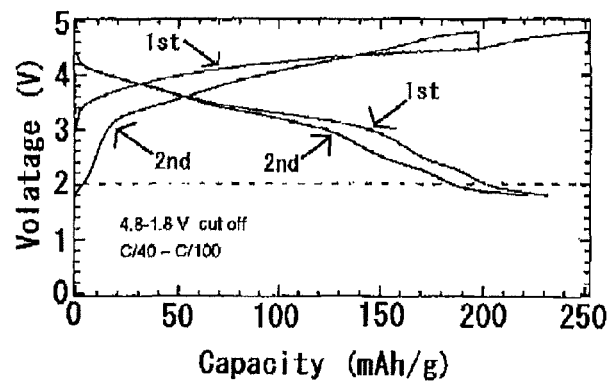
FIG. 3 is a graph showing the charge-discharge curves of the lithium battery of Example 2.
Figure 4:
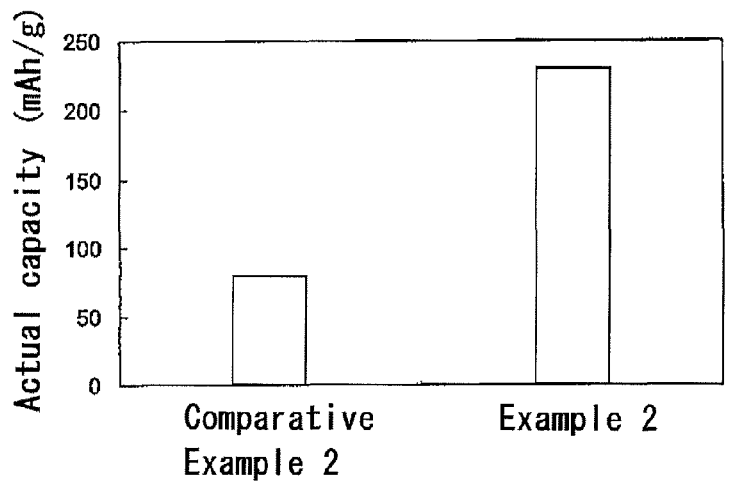
FIG. 4 is a bar graph comparing the first discharge capacity (actual capacity) of the lithium battery of Comparative Example 2 to that of Example 2.
Figure 5:
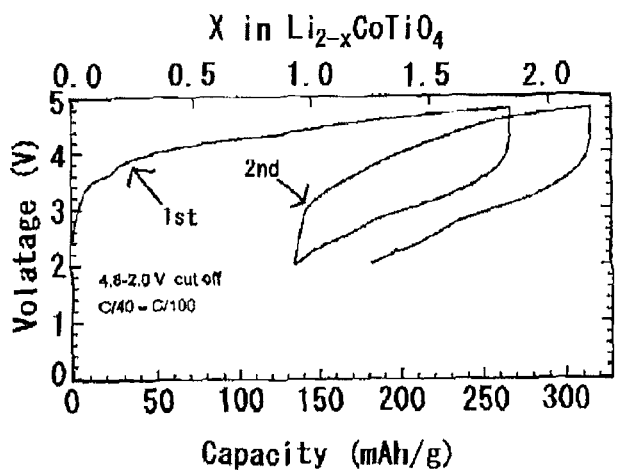
FIG. 5 is a graph showing the charge-discharge curves of the lithium battery of Comparative Example 2.

FIG. 3 is a graph showing the charge-discharge curves of the lithium battery of Example 2. FIG. 5 is a graph showing the charge-discharge curves of the lithium battery of Comparative Example 2. In both of FIGS. 3 and 5, it is shown that the results of the first and second charge-discharge tests are overlapped with each other. FIG. 4 is a bar graph comparing the first discharge capacity (actual capacity) of the lithium battery of Comparative Example 2 to that of Example 2, the discharge capacities being those obtained from the charge-discharge curves shown in FIGS. 3 and 5.

As is clear from the first charge curve shown in FIG. 5, for the lithium battery of Comparative Example 2, among all lithium ions in Li$_2$CoTiO$_4$, only about 1.8 mol of them involved in electrode reaction. As a result, the discharge capacity of the lithium battery of Comparative Example 2 remains 144 mAh/g.

Meanwhile, as shown in FIG. 4, the discharge capacity of the lithium battery of Example 2 is 230 mAh/g.

The reason why the lithium battery of Example 2 obtained such a high discharge capacity is presumed as follows. In the cathode active material containing three kinds of transition metals of nickel, cobalt and manganese, the transition metal atoms contained have a wider variety of ionic radii and valences, compared to conventional cathode active materials containing cobalt only. Because of this, lithium diffusion paths are formed in a different way from conventional cathode active materials. Therefore, the diffusion of 2 mol of lithium ions with respect to 1 mol of cathode active material, which has been impossible for conventional cathode active materials to achieve, becomes possible. As a result, discharge capacity is increased.

As is also clear from FIG. 3, upon charge, the potential of the lithium battery of Example 2 is 4 V or more. Therefore, it is clear that the cathode for lithium batteries which contains the cathode active material of the present invention, has an extremely higher charge-discharge capacity, among so-called high-potential cathodes.

This time, the lithium battery containing Li$_2$CoTiO$_4$ was tested. However, it is considered that lithium batteries containing other kinds of conventional Li$_2$MTiO$_4$-based cathode active materials such as Li$_2$MnTiO$_4$ and Li$_2$NiTiO$_4$, are inferior to the lithium battery of Example 2 in battery performance.

First, for Li$_2$MnTiO$_4$, there is no known example that can successfully synthesize single-phase Li$_2$MnTiO$_4$ (cf. M. Kuzma, et al., J. of Power Sources, 189 (2009) 81-88). Therefore, it is thought that Mn has difficulty in entering the crystal structure of the Fm-3m space group.

On the other hand, although Li$_2$NiTiO$_4$ can obtain a certain capacity, two-electron reaction is less likely to occur from the viewpoint of oxidation-reduction potential. Therefore, it is considered that a capacity of more than 200 mAh/g is less likely to be obtained (cf. S. R. S. Prabaharan, et al., Solid State Ionics, 172 (2004) 39-45).

As described above, the actual capacity of Li$_2$CoTiO$_4$ is less than 150 mAh/g. Presumably, from the viewpoint of the crystal structure of Li$_2$CoTiO$_4$, it is considered that the lithium ion diffusivity of Li$_2$CoTiO$_4$ is not excellent (cf. M. Yang, et al., J. Mater. Chem., 22 (2012) 6200).

It is considered that Li$_2$Ni$_{1/3}$Co$_{1/3}$Mn$_{1/3}$TiO$_4$ of Example 1 is better than conventional Li$_2$MTiO$_4$-based cathode active materials, from the viewpoint of being able to overcome the above-mentioned problems with Li$_2$MnTiO$_4$, Li$_2$NiTiO$_4$ and Li$_2$CoTiO$_4$ and being synthesizable.

REFERENCE SIGNS LIST

1. Electrolyte layer
2. Cathode active material layer
3. Anode active material layer
4. Cathode current collector
5. Anode current collector
6. Cathode
7. Anode
100. Lithium battery

The invention claimed is:

1. A cathode active material for lithium batteries, wherein the cathode active material is represented by the following composition formula (1) and has a rock salt type crystal structure:

$$\text{Li}_2\text{Ni}_{1-x-y}\text{Co}_x\text{Mn}_y\text{TiO}_4 \quad \text{Composition formula (1):}$$

wherein x and y are real numbers that satisfy $0.1<x<0.8$, $0.1<y<0.8$ and $x+y<1$.

2. The cathode active material for lithium batteries according to claim 1, wherein the rock salt type crystal structure is an irregular rock salt type crystal structure.

3. A lithium battery comprising a cathode, an anode and an electrolyte layer disposed between the cathode and the anode, wherein the cathode comprises at least the cathode active material for lithium batteries, which is defined by claim 1.

* * * * *